US008693186B2

(12) United States Patent
Wu

(10) Patent No.: US 8,693,186 B2
(45) Date of Patent: Apr. 8, 2014

(54) HEAT TRANSFERRING MODULE AND START UP METHOD OF ELECTRONIC DEVICE

(75) Inventor: Chi-Jung Wu, New Taipei (TW)

(73) Assignee: Getac Technology Corporation, Hsinchu (TW)

( * ) Notice: Subject to any disclaimer, the term of this patent is extended or adjusted under 35 U.S.C. 154(b) by 288 days.

(21) Appl. No.: 13/342,337

(22) Filed: Jan. 3, 2012

(65) Prior Publication Data

US 2013/0050936 A1 Feb. 28, 2013

(30) Foreign Application Priority Data

Aug. 24, 2011 (CN) .......................... 2011 1 0243210

(51) Int. Cl.
*H05K 7/20* (2006.01)
*F28F 7/00* (2006.01)
(52) U.S. Cl.
USPC ............ 361/679.53; 361/679.52; 361/679.55; 361/689; 361/699; 165/80.4; 174/15.1
(58) Field of Classification Search
None
See application file for complete search history.

(56) References Cited

U.S. PATENT DOCUMENTS

| 6,556,439 | B2* | 4/2003 | Shibasaki | 361/679.52 |
|---|---|---|---|---|
| 7,710,722 | B2* | 5/2010 | Suzuki et al. | 361/699 |
| 7,791,876 | B2* | 9/2010 | Moore et al. | 361/679.53 |
| 7,978,474 | B2* | 7/2011 | Ali | 361/700 |
| 8,081,463 | B2* | 12/2011 | Chiu-Mao et al. | 361/702 |
| 8,303,267 | B2* | 11/2012 | Nitta et al. | 417/360 |
| 8,432,691 | B2* | 4/2013 | Toftloekke et al. | 361/698 |
| 2003/0151892 | A1* | 8/2003 | Kondo et al. | 361/687 |
| 2009/0009968 | A1* | 1/2009 | Hongo | 361/699 |

* cited by examiner

*Primary Examiner* — Boris Chervinsky

(57) ABSTRACT

A heat transferring module adapted to an electronic device is provided. The electronic device includes at least one heat source and a plurality of ready-to-heat elements. The heat transferring module includes at least one water head, at least two loop heat pipes, at least two pumps, and a working fluid. The water head is thermally connected to the heat source. The loop heat pipes are connected to the water head respectively, and at least one of the loop heat pipes is thermally connected to the ready-to-heat elements. Each pump is connected to the corresponding loop heat pipe. The working fluid flows into the water head and at least one of the loop heat pipes by at least one of the pumps, so heat generated by the heat source is transferred to at least one of the ready-to-heat elements. A method of starting up an electronic device is also provided.

17 Claims, 4 Drawing Sheets

HEAT TRANSFERRING MODULE AND START UP METHOD OF ELECTRONIC DEVICE

BACKGROUND OF THE INVENTION

1. Field of the Invention

The invention relates to a heat transferring module. Particularly, the invention relates to a heat transferring module of an electronic device.

2. Description of Related Art

In recent years, with rapid development of computer technology, computer operating speed is continually enhanced, and heat generation rates of electronic components in a computer host are constantly increased. In order to prevent overheating of the electronic components in the computer host from causing temporary or permanent damages to the electronic components, it is important to provide an adequate heat cooling effect to the electronic components in the computer host.

For example, in a computer system, a central processing unit (CPU), a north bridge chip, a south bridge chip or other heating elements are configured on a mother board. In order to dissipate the heat generated on the mother board during a high speed operation, cooling devices are generally configured with the heating elements for cooling the heating elements based on the conventional technique.

However, when the electronic device is used in various temperature environments, for example, polar regions and deserts, etc., the operation environment may be in a very low temperature, and a method for raising to a working temperature from a low temperature operation environment is to configure heating elements in the electronic device to heat the electronic components. However, such method may increase the volume and manufacturing cost of the electronic device. Therefore, the present invention is developed to ensure the electronic device to work under various temperature environments.

SUMMARY OF THE INVENTION

The invention is directed to a heat transferring module, which has a better heat utilization rate.

The invention is directed to a method for starting up an electronic device, by which the electronic device is capable of being quickly started up in a low-temperature environment.

The invention provides a heat transferring module adapted to an electronic device. The electronic device includes at least one heat source and a plurality of ready-to-heat elements. The heat transferring module includes at least one water head, at least two loop heat pipes, at least two pumps, and a working fluid. The water head is thermally connected to the heat source. The loop heat pipes are respectively connected to the water head, and at least one of the loop heat pipes is thermally connected to the ready-to-heat elements. Each of the pumps is connected to the corresponding loop heat pipe. The working fluid flows into the water head and at least one of the loop heat pipes by at least one of the pumps, so as to transfer the heat generated by the heat source to at least one of the ready-to-heat elements.

The invention provides a method for starting up an electronic device. The electronic device includes at least a first electronic element, at least a second electronic element, and at least two heat transferring loops. Each of the heat transferring loops includes a water head, a pump and a loop heat pipe connected to each other thereof. The loop heat pipe contains a working fluid, and a heat quantity generated by the first electronic element being received with a unit of electric power is greater than or equal to a heat quantity generated by the second electronic element being received with a unit of electric power. The method for starting up the electronic device includes the following steps. A start up request of the electronic device is received. The first electronic element is driven to generate heat. The heat generated by the first electronic element is transferred to the water head. The pump is driven to make the working fluid flow in the loop heat pipe. The heat generated by the first electronic element is transferred to at least one of the second electronic elements through the flow of the working fluid. Then, after the second electronic element reaches at a predetermined temperature, the second electronic element enters a working mode.

In an embodiment of the invention, the working fluid is capable of flowing below zero degree Celsius.

In an embodiment of the invention, the working fluid includes an anti-freezing fluid.

In an embodiment of the invention, the working fluid includes an anticorrosion fluid and water.

In an embodiment of the invention, the heat source is one of a central processing unit (CPU), a display chip, a south/north bridge chip, a micro controller, or a combination thereof.

In an embodiment of the invention, the ready-to-heat element is one of a power storage unit, a data storage unit, a display unit, a compact disc drive, or a combination thereof.

In an embodiment of the invention, the power storage unit and the data storage unit are thermally contacted to one of the loop heat pipes, and the display unit is thermally contacted to another one of the loop heat pipes.

In an embodiment of the invention, the heat transferring module includes a plurality of loop heat pipes. The power storage unit, the data storage unit and the display unit are thermally contacted to different loop heat pipes, respectively.

In an embodiment of the invention, the water head has at least two water retention spaces disconnected to each other.

In an embodiment of the invention, the water head is thermally connected to the two heat sources.

In an embodiment of the invention, each of the second electronic elements includes at least one of a power storage unit, a data storage unit, a display unit or a combination thereof, and the second electronic elements are thermally contacted to different heat transferring loops. The method for starting up the electronic device further includes following steps. The heat transferring loop thermally contacted to the power storage unit and the data storage unit is turned for transferring heat to the power storage unit and the data storage unit. When the power storage unit and the data storage unit reach at the working temperature, the heat transferring loop thermally contacted to the power storage unit and the data storage unit is turned off, and the heat transferring loop thermally contacted to the display unit is turned on.

In an embodiment of the invention, when the electronic device is electrically connected to an external power supply, the heat transferring loop thermally contacted to the data storage unit is turned on to transfer heat to the data storage unit. When the data storage unit reaches a working temperature, the heat transferring loop thermally contacted to the data storage unit is turned off, and the heat transferring loop thermally contacted to the power storage unit is turned on.

In an embodiment of the invention, when the electronic device is started up by the power storage unit, the heat transferring loop thermally contacted to the power storage unit is turned on for transferring the heat to the power storage unit. When the power storage unit reaches at the working temperature, the heat transferring loop thermally contacted to the power storage unit is turned off, and the heat transferring loop thermally contacted to the data storage unit is turned on.

In an embodiment of the invention, heat generated by the second electronic element after reaching at the working temperature is transferred to the non-started second electronic devices through the heat transferring loop.

In an embodiment of the invention, the start up refers to a G0/S0 state (a working state) entered from any of a G1 state (a sleeping state) and a G2 state (a soft off state) under the definition of Advanced Configuration and Power Interface (ACPI).

In an embodiment of the invention, the G1 state includes an S1, an S2, an S3 and an S4 states.

According to the above embodiments of the invention, the electronic elements in the electronic device are divided into heat sources that provide heat and ready-to-heat elements for receiving heat according to a quantity of the heat generated by the unit electric power. Moreover, the electronic elements are respectively configured to different loop heat pipes according to a starting sequence required, so that the heat generated by the heat sources is sequentially transferred to the ready-to-heat elements, so as to sequentially start up each electronic element. In this way, the heat generated by the electronic elements can serve as the heat required by the ready-to-heat elements in case of low temperature, so as to save the cost required for additionally adding the heating elements.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
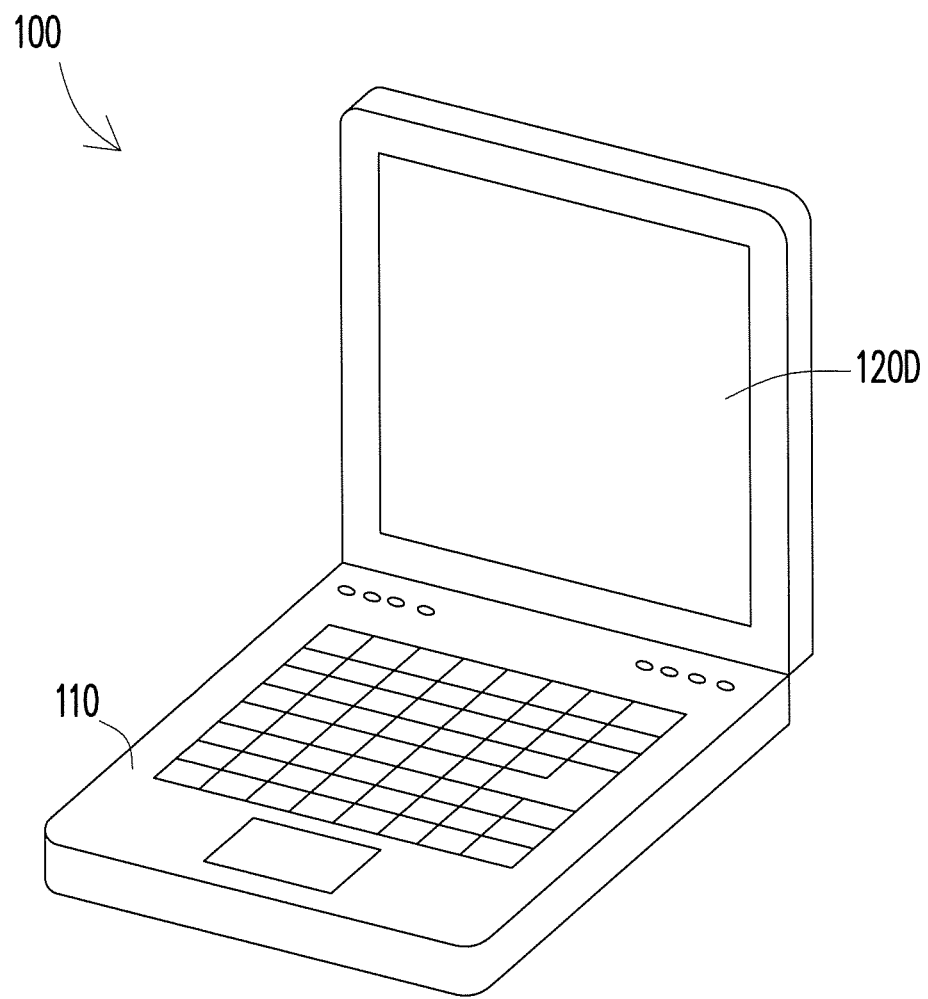
FIG. 1 is a schematic diagram of an electronic device according to an embodiment of the invention.
Figure 2:
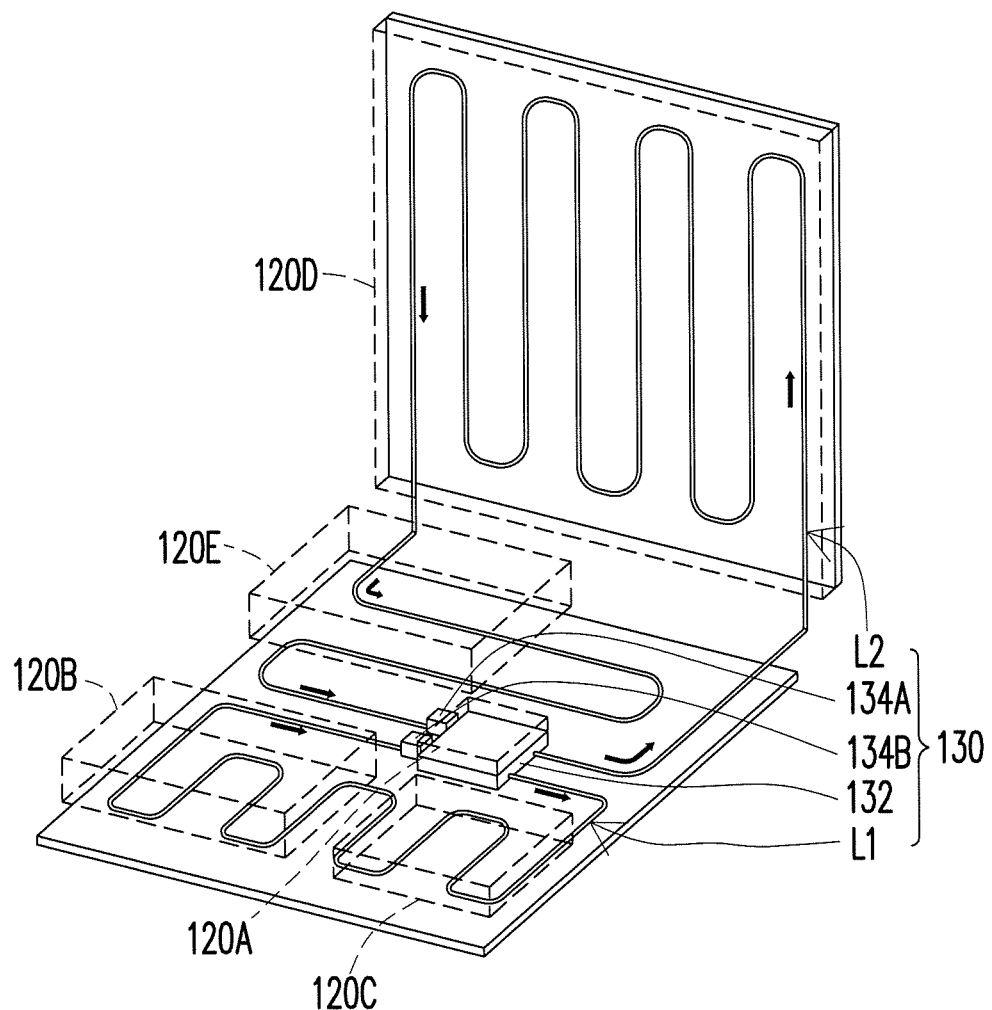
FIG. 2 is a schematic diagram of the internal components of the electronic device of FIG. 1.
Figure 3:
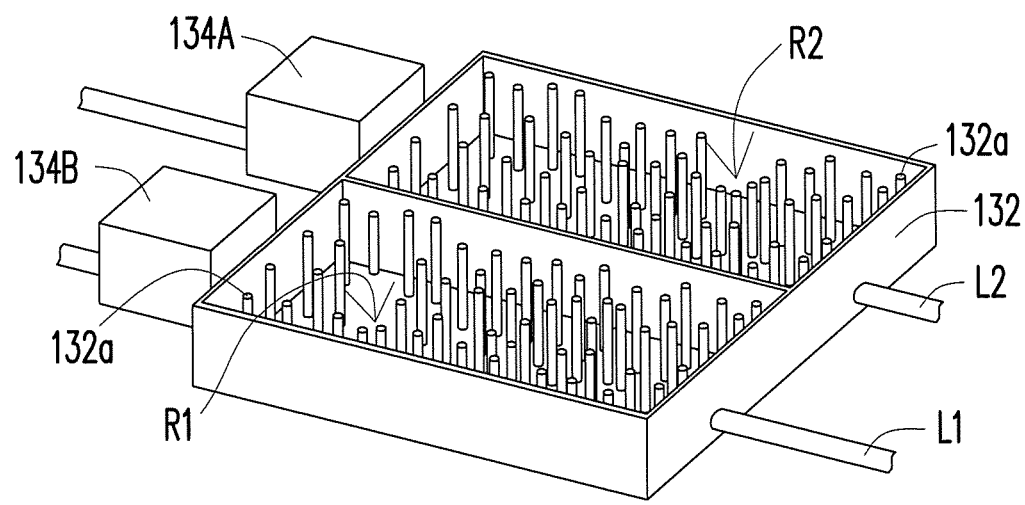
FIG. 3 is a partial enlarged diagram of a water head of the electronic device of FIG. 2.

FIG. 1 is a schematic diagram of an electronic device according to an embodiment of the invention. FIG. 2 is a schematic diagram of the internal components of the electronic device of FIG. 1. Referring to FIG. 1 and FIG. 2, in the present embodiment, the electronic device 100 is, for example, a notebook computer, which includes a body 110, a plurality of electronic elements 120A-120E disposed in the body 110 and a heat transferring module 130. FIG. 3 is a partially enlarged diagram of a water head of the electronic device of FIG. 2. Referring to FIG. 2 and FIG. 3, the heat transferring module 130 includes a water head 132, two loop heat pipes L1 and L2, two pumps 134A and 134B, and a working fluid (arrows are used to represent flowing directions of the fluid).

In the present embodiment, each of the electronic elements 120A-120E may be, for example, one of a central processing unit (CPU), a display chip, a south/north bridge chip, a power storage unit (a battery), a data storage unit (a memory or a hard disc), a display unit, a compact disc (CD) drive, or a combination thereof to serve as the main-function components composing the electronic device 100. However, the type of the electronic device is not limited by the invention. In other embodiments that are not illustrated, the electronic device can also be a flat panel computer or a mobile phone, etc., and the electronic element can be a CPU (used in the flat panel computer), a micro controller (used in the mobile phone), or a relevant electronic chips and modules.

It should be noted that as the operation environment of the electronic device 100 changes, the electronic elements 120A-120E disposed in the body 110 and the heat transferring module 130 have different heat transferring relationships. For example, when the electronic device 100 is operated in an operation environment of room temperature, the heat transferring module 130 is used to transfer the heat generated by the electronic elements 120A-120E outside the body 110, so as to achieve a cooling effect to enhance the performance of the electronic elements 120A-120E through.

It should be noted that when the electronic device 100 is operated in an operation environment of low-temperature, the electronic elements 120A-120E are further divided into heat sources and ready-to-heat elements according to quantities of the heats generated by the electronic elements 120A-120E during operation, and a heat generation sequence thereof, with reference to the limitations of the different working temperatures of the electronic elements 120A-120E and a start up method of the electronic device 100. In other words, the heat source is the electronic element 120A that is started up immediately when the electronic device 100 receives power, and accordingly generates heat to serve as a heat provider, while the ready-to-heat elements are the electronic elements 120B-120E that are started up after receiving the heat generated by the heat source through the heat transferring module 130. In the present embodiment, the electronic elements 120A-120E are started up sequentially according to the order in the starting process of the electronic device 100, wherein the heat generated by the electronic element 120A that is started first is used to increase the temperature of the electronic elements 120B-120E that are still not started to a working temperature. Therefore, by reusing the heat, the cost for adding heating elements to the electronic elements 120B-120E under the environment of low temperature is saved. Accordingly, the electronic elements 120A-120E are configured in collaboration with the heat transferring module 130 according to the above conditions and are sequentially started up. Based on the thermal connection between the heat transferring module 130 and the heat source and the ready-to-heat elements, the electronic device 100 may have better performance in any type of environment. However, the starting sequence of the electronic elements 120A-120E is not limited by the present invention. A designer can appropriately change the starting sequence according to the usage environment and actual need of the electronic device 100.

Moreover, in the notebook computer of the present embodiment, one of the internal CPU, the display chip, the south/north bridge chip or a combination thereof can be considered as the heat source 120A according to their respective characteristics. On the other hand, the electronic elements 120B-120E considered ready-to-heat elements include one of a power storage unit (a battery), a data storage unit (a memory or a hard disc), a display unit, a CD drive, or a combination thereof. Moreover, in another embodiment that is not illustrated, when the electronic device is a flat panel computer or a mobile phone, the heat source may be a CPU, a micro controller or a relevant electronic chip. The types of the electronic device and the electronic elements serving as the heat source and the ready-to-heat elements in the electronic device are not limited in the present embodiment of the invention. That is, in the electronic device 100 of the embodiment, the heat source can be considered as an element that generates greater heat when inputted with a unit of electric power. Such element has higher priority in the start-up sequence, so the heat generated by such element can be used to provide the heat necessary for the ready-to-heat elements. In the following embodiments, for the purpose of further explanation, the electronic element 120B represents a power storage unit, the electronic element 120C represents a data storage unit, the electronic element 120D represents a display unit, and the electronic element 120E represents a CD drive.

On the other hand, the water head 132 of the heat transferring module 130 is substantially thermally contacted to the heat source 120A The loop heat pipes L1 and L2 are respectively connected to the water head 132, and the ready-to-heat elements 120B-120D are respectively disposed on the loop heat pipes L1 and L2. The working fluid flows in the loop heat pipes L1 and L2 by the pumps 134A and 134B. Accordingly, the heat can be taken away from the heat source 120A by the working fluid in the water head 132 and the loop heat pipes L1 and L2. By controlling the pumps 134A and 134B to open or close the loop heat pipes L1 and L2, the heat absorbed by the working fluid at the water head 132 can be transferred to the outside of the electronic device 100 through the loop heat pipes L1 and L2 arranged all over the body 110, or can be transferred to the ready-to-heat elements 120B-120E in the electronic device 100.

It should be noted that the phrase "thermal contact" in above embodiments refers to a direct thermal contact between objects or an indirect thermal contact between objects through conduction, convection and radiation, etc.

In detail, although cooling effects of the electronic devices being studied, no relevant research can simultaneously resolve the potential problem encountered when the electronic device is under the environment of low temperature. Therefore, to achieve applicability of the heat transferring module 130 in both the environments of high-temperature and low-temperature, the working fluid of the present embodiment includes an anti-freezing fluid, an anticorrosion fluid and water, whereas the preferable weight ratios of each of the components are anti-freezing fluid of 30%-45%, anti-corrosion fluid of 3%-10% and water of 52%-60%. The working fluid so formed has a specific gravity of 1.05 g/cm$^3$, a viscosity of 3.4 cps, a PH value of 6.5, a resistance of 2.3 k$\Omega$, and a solidification temperature of $-42°$ C. Therefore, the working fluid can be simultaneously used in the high-temperature and the low-temperature environments.

Figure 4:
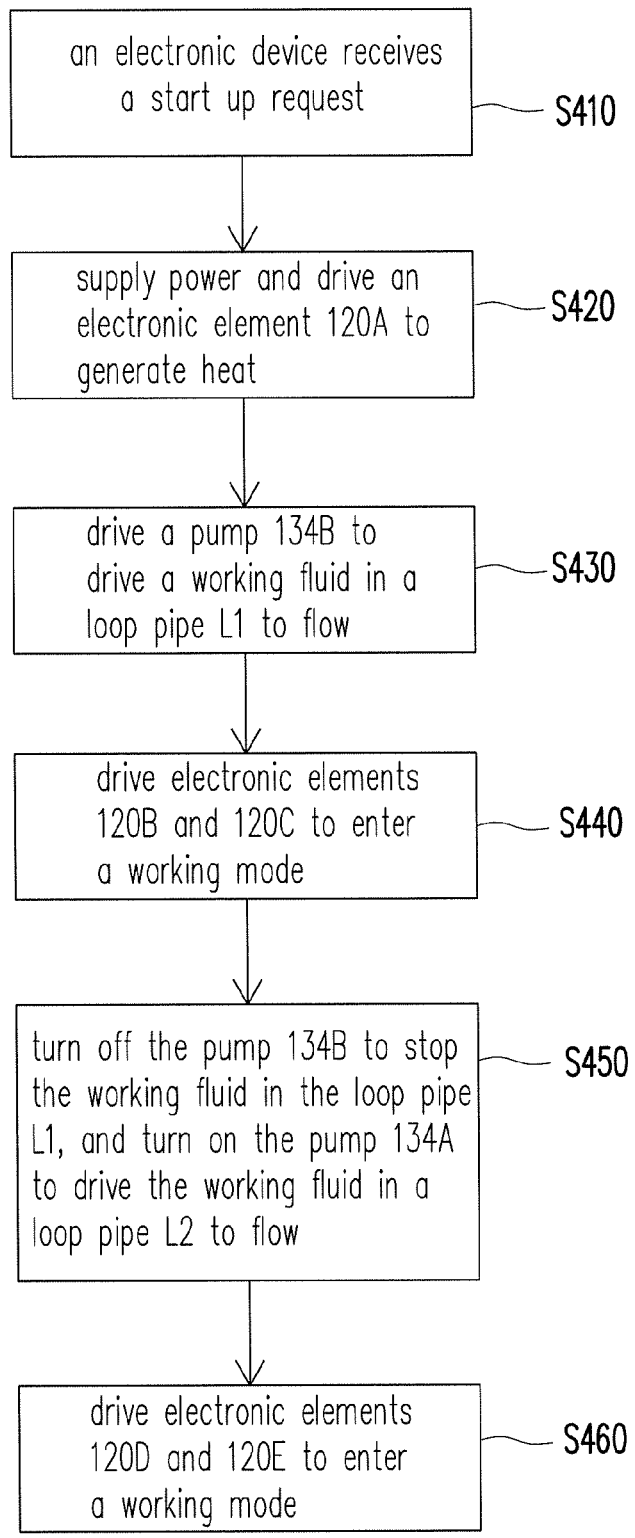
FIG. 4 is a flowchart illustrating a method for starting up the electronic device of FIG. 2.

Moreover, in the present embodiment, based on the star-up requirement of the electronic device 100, the electronic element 120B (the power storage unit) and the electronic element 120C (the data storage unit) are disposed on the loop heat pipe L1, and the electronic element 120D (the display unit) and the electronic element 120E (the CD drive) are disposed on the loop heat pipe P2. FIG. 4 is a flowchart illustrating a method for starting up the electronic device of FIG. 2. Referring to FIG. 2 to FIG. 4 for an explanation of the electronic device 100 in an environment of low temperature, it should be noted that the start-up of the electronic device 100 does not merely refer to the start-up from a power off state. Namely, in the present embodiment, the start-up of the electronic device 100 includes a G0/S0 state (a working state) entered from either a G1 state (a sleeping state) or a G2 state (a soft off state) defined by the Advanced Configuration and Power Interface (ACPI). The G1 state includes an S1 state (power supply to a CPU and a memory is still maintained, although commands are not executed), an S2 state (no power supply to the CPU), an S3 state (standby) and an S4 state (hibernation or safe sleep), etc.

Accordingly, in steps S410 and S420, after the electronic device 100 receives a start-up request from the user, a power is turned on to drive the electronic element 120A to enable the electronic element 120A to first operate to generate heat, so the heat is absorbed by the working fluid at the water head 132. Then, in step S430, the electronic device 100 activates the pump 134B to drive the working fluid in the loop heat pipe L1 to flow. As a result, the heat generated by the electronic element 120A is transferred to the electronic element 120B (the power storage unit) and the electronic element 120C (the data storage unit) by the working fluid in the loop heat pipe L1. When the electronic element 120B (the power storage unit) and the electronic element 120C (the data storage unit) reach a working temperature, they are driven to enter a working mode, as disclosed in step S440.

It should be noted that because the electronic element 120B (the power storage unit) and the electronic element 120C (the data storage unit) are located on the same loop heat pipe L1, the electronic element 120B (the power storage unit) is also heated to reach the working temperature while the data storage unit 120C is heated, so an external power supply can charge the electronic element 120B (the power storage unit). However, in another embodiment that is not illustrated, wherein the electronic element 120B (the power storage unit) and the electronic element 120C (the data storage unit) are not located on the same loop heat pipe, the aforementioned step 5430 is changed according to the power source required for starting up the electronic device 100. For example, if the electronic device 100 is electrically connected to an external power supply (not shown), the electronic device 100 first turns on the loop heat pipe thermally contacted to the electronic element 120C (the data storage unit), and then turns off such loop heat pipe after the electronic element 120C (the data storage unit) reaches the working temperature, and turns on the loop heat pipe thermally contacted to the electronic element 120B (the power storage unit) for heating.

On the other hand, when the electronic device 100 is started up by the power of its own electronic element 120B (the power storage unit), the loop heat pipe thermally contacted to the electronic element 120B (the power storage unit) is first turned on to heat the electronic element 120B (the power storage unit), and such loop heat pipe is turned off after the electronic element 120B (the power storage unit) reaches the working temperature, and then the loop heat pipe thermally contacted to the electronic element 120C (the data storage unit) is turned on. In this way, the heat generated by the electronic element 120A is first supplied to the electronic element 120B (the power storage unit), so that the power output efficiency thereof is improved as temperature increases, so as to effectively reduce the start-up time of the power storage unit 120B.

Then, in step S450, after the electronic element 120B (the power storage unit) and the electronic element 120C (the data storage unit) reach the working temperature, the pump 134B is turned off to stop the flow of the working fluid in the loop heat pipe L1, and the loop heat pipe L2, which is thermally contacted to the electronic element 120D (the display unit) and the electronic device 120E (the CD drive), is turned on to implement the next stage of the start-up operation of the electronic device 100. In step S460, when the electronic element 120D (the display unit) and the electronic device 120E (the CD drive) reach the working temperature, they are driven to enter the working mode.

Similarly, since the electronic element 120D (the display unit) and the electronic element 120E (the CD drive) are located on the same loop heat pipe L2, the heat is simultaneously transferred to the two electronic elements. In another embodiment that is not illustrated, when the electronic element 120D (the display unit) and the electronic element 120E (the CD drive) are not located on the same loop heat pipe, the electronic element 120E (the CD drive) is heated after the electronic element 120D (the display unit) is started up. Therefore, in the electronic device 100 of the present embodiment, the starting sequence thereof under the low-temperature environment is sequentially the electronic element 120A, the electronic element 120B or 120C, the electronic element 120D and the electronic element 120E. Consequently, the electronic device 100 is started up according to the user's demand by following the aforementioned starting sequence.

However, the aforementioned starting sequence is not limited in the present embodiment. The starting sequence can be appropriately changed according to types of the electronic device and the electronic elements and the instant user's requirement. For example, in another embodiment that is not illustrated, the main electronic elements of a mobile phone include a micro controller, a display unit and a power storage unit. When the mobile phone is started up under the low-temperature environment and after the micro controller is started up by the power of the power storage unit, a heat transferring module is used to transfer the heat generated by the micro controller to the power storage unit to first improve the power output efficiency of the power storage unit. Once the micro controller and the power storage unit reach the working temperature, the heat generated by the micro controller is transferred to the display unit through the heat transferring module, so as to complete the start-up procedure of the mobile phone.

Referring to FIG. 3, in the present embodiment, the water head 132 has two water spaces R1 and R2 not connecting to each other. The water spaces R1 and R2 are respectively connected to the loop heat pipes L1 and L2 to separate different loop heat pipes L1 and L2, so as to improve efficiency of the heat transferring module 130 when only one of the loop heat pipes L1 and L2 is used to transfer heat. For example, when only the pump 134B is turned on, i.e. only the working fluid in the loop heat pipe L1 is driven, all the heat absorbed by the water head 132 can be transferred to the electronic elements 120B and 120C thermally contacted to the loop heat pipe L1 to quickly raise the temperatures of the electronic elements 120B and 120C and decrease the start-up time thereof. Moreover, the water head 132 has a plurality of heat transferring pillars 132a disposed in the water spaces R1 and R2 to enable the heat generated by the electronic element 120A to be transferred evenly and quickly to the working fluid in the water spaces R1 and R2.

In sum, in the aforementioned embodiments of the invention, the electronic elements in the electronic device are divided into heat sources for providing heat and ready-to-heat elements for receiving heat, according to the quantity of the heat generated by a unit of electric power. Such electronic elements are respectively configured to different loop heat pipes according to the requisite start-up sequence, so that the heat generated by the heat sources is sequentially transferred to the ready-to-heat elements, and the electronic elements are sequentially started up. Accordingly, the heat generated by the electronic elements can be reused and serve as the required heat for the ready-to-heat elements in case of a low temperature. The cost for additionally adding heating elements can consequently be saved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A heat transferring module, adapted to an electronic device comprising at least one heat source and a plurality of ready-to-heat elements, the heat transferring module comprising:
   at least one water head, thermally connected to the heat source;
   at least two loop heat pipes, respectively connected to the water head, and at least one of the loop heat pipes being thermally connected to the ready-to-heat elements;
   at least two pumps, wherein each of the pumps is connected to the corresponding loop heat pipe; and
   a working fluid, flowing in the water head and at least one of the loop heat pipes by at least one of the pumps, for transferring the heat generated by the heat source to at least one of the ready-to-heat elements.

2. The heat transferring module as claimed in claim 1, wherein the working fluid is capable of flowing below zero degree Celsius.

3. The heat transferring module as claimed in claim 2, wherein the working fluid comprises an anti-freezing fluid.

4. The heat transferring module as claimed in claim 2, wherein the working fluid further comprises an anticorrosion fluid and water.

5. The heat transferring module as claimed in claim 1, wherein the heat source is one of a central processing unit (CPU), a display chip, a south/north bridge chip, a micro controller, or a combination thereof.

6. The heat transferring module as claimed in claim 1, wherein the ready-to-heat element is one of a power storage unit, a data storage unit, a display unit, a compact disc drive, or a combination thereof.

7. The heat transferring module as claimed in claim 6, wherein the power storage unit and the data storage unit are thermally contacted to one of the loop heat pipes, and the display unit is thermally contacted to another one of the loop heat pipes.

8. The heat transferring module as claimed in claim 6, wherein the heat transferring module comprises a plurality of loop heat pipes, and the power storage unit, the data storage unit and the display unit are thermally contacted to different loop heat pipes, respectively.

9. The heat transferring module as claimed in claim 1, wherein the water head has at least two water spaces not connecting to each other.

10. The heat transferring module as claimed in claim 1, wherein the water head is thermally connected to two heat sources.

11. A method for starting up an electronic device, wherein the electronic device comprises at least a first electronic element, at least a second electronic element, and at least two heat transferring loops, wherein each of the heat transferring loops comprises a water head, a pump and a loop heat pipe connected to each other thereof, wherein the loop heat pipe contains a working fluid, and a quantity of heat generated by the first electronic element being inputted with a unit electric power is greater than or equal to a quantity of heat generated by the second electronic element being inputted with the unit electric power, the method for starting up the electronic device comprising:

receiving a start up request of the electronic device;

driving the first electronic element to generate heat;

transferring the heat generated by the first electronic element to the water head;

driving the pump to drive the working fluid in the loop heat pipe to flow;

transferring the heat generated by the first electronic element to the at least one of the second electronic elements by flow of the working fluid;

driving the second electronic element to enter a working mode after the second electronic element reaches a working temperature.

12. The method for starting up the electronic device as claimed in claim 11, wherein each of the second electronic elements comprises at least one of a power storage unit, a data storage unit, a display unit or a combination thereof, and the second electronic elements are thermally contacted to different heat transferring loops, wherein the method for starting up the electronic device further comprises:

turning on the heat transferring loop thermally contacted to the power storage unit and the data storage unit to transfer heat to the power storage unit and the data storage unit; and turning off the heat transferring loop thermally contacted to the power storage unit and the data storage unit when the power storage unit and the data storage unit reach the working temperature, and turning on the heat transferring loop thermally contacted to the display unit.

13. The method for starting up the electronic device as claimed in claim 12, further comprising:

turning on the heat transferring loop thermally contacted to the data storage unit when the electronic device is electrically connected to an external power supply, for transferring heat to the data storage unit; and turning off the heat transferring loop thermally contacted to the data storage unit when the data storage unit reaches the working temperature, and turning on the heat transferring loop thermally contacted to the power storage unit.

14. The method for starting up the electronic device as claimed in claim 12, further comprising:

turning on the heat transferring loop thermally contacted to the power storage unit when the electronic device is started up by the power storage unit, for transferring heat to the power storage unit; and turning off the heat transferring loop thermally contacted to the power storage unit when the power storage unit reaches a working temperature, and turning on the heat transferring loop thermally contacted to the data storage unit.

15. The method for starting up the electronic device as claimed in claim 12, further comprising:

transferring heat generated by the second electronic element reaching the working temperature to the non-started second electronic devices through the heat transferring loop.

16. The method for starting up the electronic device as claimed in claim 11, wherein the start up refers to a G0/S0 state (a working state) entered from either a G1 state (a sleeping state) or a G2 state (a soft off state) defined by an advanced configuration and power interface (ACPI).

17. The method for starting up the electronic device as claimed in claim 16, wherein the G1 state comprises an S1 state, an S2 state, an S3 state and an S4 state.

* * * * *